(12) United States Patent
Mola et al.

(10) Patent No.: US 10,481,999 B2
(45) Date of Patent: Nov. 19, 2019

(54) PARTIAL PROCESS RECORDING

(71) Applicant: Microsoft Technology Licensing, LLC, Redmond, WA (US)

(72) Inventors: Jordi Mola, Bellevue, WA (US); Juan Carlos Arevalo Baeza, Bellevue, WA (US); Darek Josip Mihocka, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 18 days.

(21) Appl. No.: 15/369,332

(22) Filed: Dec. 5, 2016

(65) Prior Publication Data
US 2018/0157576 A1    Jun. 7, 2018

(51) Int. Cl.
*G06F 11/36*    (2006.01)
*G06F 9/44*    (2018.01)

(52) U.S. Cl.
CPC ........ *G06F 11/364* (2013.01); *G06F 11/3636* (2013.01)

(58) Field of Classification Search
CPC .................................................. G06F 11/364
USPC ....................................................... 717/128
See application file for complete search history.

(56) References Cited

U.S. PATENT DOCUMENTS

| | | | |
|---|---|---|---|
| 7,958,497 B1 | 6/2011 | Linda et al. | |
| 8,042,179 B2 | 10/2011 | Shoji et al. | |
| 8,719,796 B2 * | 5/2014 | Rosu | G06F 11/302 717/128 |
| 8,997,058 B2 * | 3/2015 | Bohnet | G06F 11/3612 717/128 |
| 9,038,031 B2 | 5/2015 | Subhraveti | |
| 9,311,221 B2 | 4/2016 | Wood et al. | |
| 2004/0064685 A1 * | 4/2004 | Nguyen | G06F 11/348 712/227 |
| 2004/0250164 A1 | 12/2004 | Ahmad et al. | |
| 2004/0268314 A1 * | 12/2004 | Kollman | G06F 11/3476 717/128 |
| 2007/0168995 A1 | 7/2007 | Cohen | |
| 2009/0049428 A1 * | 2/2009 | Cozmei | G06F 11/3636 717/128 |
| 2009/0320001 A1 | 12/2009 | Bates et al. | |
| 2011/0138363 A1 * | 6/2011 | Schmelter | G06F 11/3636 717/128 |
| 2012/0159452 A1 | 6/2012 | DeLine et al. | |
| 2012/0226838 A1 * | 9/2012 | Visalli | G06F 11/364 710/110 |

(Continued)

OTHER PUBLICATIONS

Aranya et al., "Tracefs: A File System to Trace Them All", Appears in the proceedings of the Third USENIX Conference on File and Storage Technologies (FAST 2004), 15pg. (Year: 2004).*

(Continued)

*Primary Examiner* — Ryan D. Coyer
(74) *Attorney, Agent, or Firm* — Workman Nydegger

(57) ABSTRACT

Techniques for processing recorded program data are described. In implementations, a trace module in a computing device processes instructions of a recorded program and generates a trace file for program optimization. In implementations, the trace module records a subset of a received program for inclusion in the trace file. The computing device can also or instead be implemented to gather and initiate analysis of application data proactively and without user initiation.

20 Claims, 9 Drawing Sheets

(56) References Cited

U.S. PATENT DOCUMENTS

| | | |
|---|---|---|
| 2013/0117542 A1 | 5/2013 | Filachek et al. |
| 2013/0219366 A1 | 8/2013 | Rosen |
| 2013/0227350 A1 | 8/2013 | O'Riordan et al. |
| 2015/0143343 A1* | 5/2015 | Weiss .................. G06F 11/3668 717/128 |
| 2015/0148138 A1 | 5/2015 | Rabin et al. |

OTHER PUBLICATIONS

Avgustinov et al., "Making Trace Monitors Feasible", ACM, 19pg. (Year: 2007).*

Bodden et al., "Efficient Trace Monitoring", ACM, 2pg. (Year: 2006).*

Pothier et al., "Scalable Omniscient Debugging", ACM, 17pg. (Year: 2007).*

Park et al., "PRES: Probabilistic Replay with Execution Sketching on Multiprocessors", ACM, 2009, 15pg. (Year: 2009).*

Pozniansky et al., "Efficient On-the-Fly Data Race Detection in Multithreaded C++ Programs", IEEE, 2003, 8pg. (Year: 2003).*

"Record Code Execution with IntelliTrace for Debugging in Visual Studio", Published on: Jun. 13, 2013 Available at: https://msdn.microsoft.com/en-us/library/dd572114(v=vs.110).aspx.

"7 Recording Inferior's Execution and Replaying It", Published on: Sep. 7, 2015 Available at: https://sourceware.org/gdb/onlinedocs/gbd/Process-Record-and-Replay.html.

"what rr does", Published on: Oct. 23, 2016 Available at: http://rr-project.org/.

"Jockey: Extensible user-space library for record-replay debugging", Published on: Jan. 17, 2007 Avaiable at: http://home.gna.org/jockey/doc/introduction.html.

"International Search Report and Written Opinion Issued in PCT Application No. PCT/US2017/063338", dated Feb. 20, 2018, 11 Pages.

* cited by examiner

PARTIAL PROCESS RECORDING

BACKGROUND

Computing devices provide a variety of functionality to users. For instance, a program can execute on a computing device to enable users to complete various tasks. However, the program can include errors that cause the tasks to not function as expected, which can lead to user frustration.

Traditional techniques to identify errors in a program typically require capturing or having access to each part of the program. For instance, a typical debug tool receives a recording of a whole program (i.e., each of the inputs and outputs) and identifies an error that occurs during execution of the whole program. In some instances, a copy of the program is recorded in its entirety while the program executes. The recorded copy of the program can be saved as a trace file and can be used to investigate and test the program for an execution error. However, when any portion of the whole program is missing or removed the typical debug tool cannot replicate the program and thus cannot locate execution errors. Thus, traditional techniques used to investigate and test programs may be ineffective and can lead to user frustration.

In addition, performing conventional trace techniques can interrupt operation of a computing device due to an amount of data being processed while performing the trace. This delay in computer operation can be accentuated when tracing multiple programs simultaneously and/or trancing a large number of instructions. Accordingly, tracing using conventional techniques can reduce overall performance of a computing device and may not be applicable to programs of a particular size.

SUMMARY

Recording techniques are described that record a subset of a process for use in analyzing the process. In implementations, a trace module is configured to receive program data indicative of an execution of code and to record a subset of the program data in accordance with criteria. The trace module may then reproduce the execution of code responsive to a computing device processing the recorded subset of program data.

A system can be configured to perform recording techniques including tracing an execution of code in accordance with one or more criteria and during the tracing, trimming portions of the execution of code. In implementations, the system also provides a trace file that includes the trimmed portions and enables the trace file to reproduce the execution of code.

In implementations, a trace module resides on a computing device that is operable to record program data according to a first set of criteria and sample a portion of the program data according to a second set of criteria. The trace module in the computing device may also generate a trace file to include the program data recorded according to the first set of criteria and the portion of the program data sampled according to the second set of criteria.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
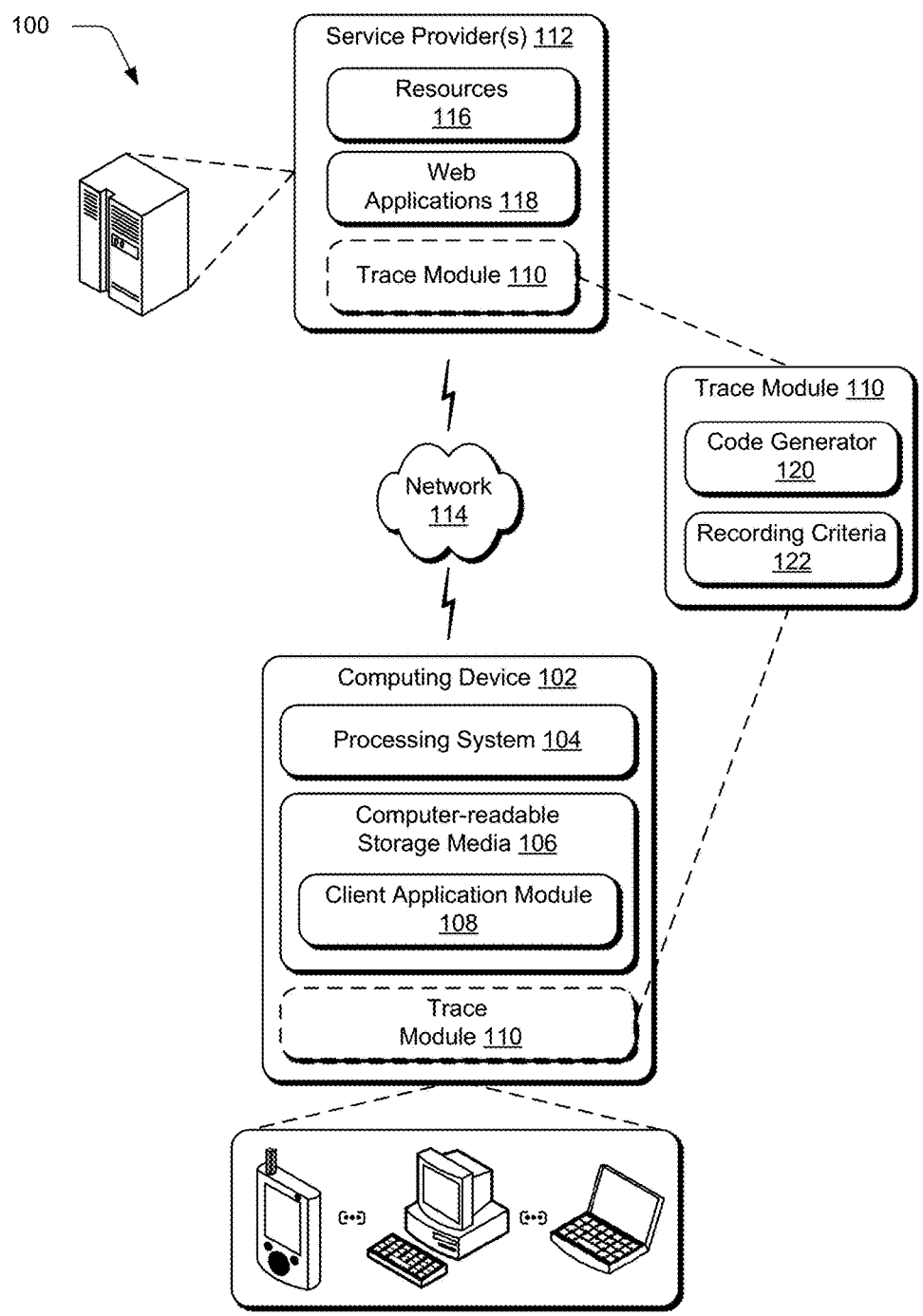
FIG. 1 is an illustration of an environment in an example implementation that is operable to employ techniques described herein.

Computing devices can employ conventional techniques that record a program by taking a 'snapshot' of memory values corresponding to a sequence of instructions. For instance, each of the inputs and outputs of the sequence of instructions are saved in memory as a trace file which is usable to 'debug' the program. However, computing devices have limited memory and processing resources available. Thus, performing conventional trace techniques can interrupt operation of a computing device which can frustrate users.

Recording techniques are described that record a subset of a process for use in process optimization. The techniques described herein, for instance, enable a process to be recorded in dependence upon selected criteria, and further enable data to be generated that is usable to identify data and/or correct an error in the process. In implementations, a trace module receives program data indicative of an execution of code and records a subset of the program data in accordance with criteria. The trace module may then reproduce the execution of code responsive to the computing device processing the recorded subset of program data. In implementations, the trace module enables different portions of the program data (e.g., recorded program data) to be identified, extracted, skipped, trimmed, and/or processed separately. In one approach, the trace module can extract and record a particular thread, a particular function, and/or a function and related function calls, just to name a few. In this way, the trace module may enable recording pre-specified program units of the recorded program in accordance with selected criteria. In implementations, the criteria can be selected via an application and can also or instead be selected automatically by the trace module to specify program units for recording. Program units, or events, may represent individual portions of a program and can include data pertaining to code, executed instructions, a function call, a kernel, a memory value, a register value, etc.

A system can be implemented to perform recording techniques including tracing an execution of code in accordance with criteria and during the tracing, trimming portions of the execution of code. In implementations, the system provides a trace file that includes the trimmed portions and is enabled to reproduce the execution of code. In one approach, the criteria employed by the system to trace and skip data can include a function execution condition to an input parameter value, a particular amount of trace data, a percentage of the recorded execution of code, code not in a particular module, code signed by a particular entity, or a combination thereof. By tracing the execution of code according to the criteria, the trace module is able to trace only portions of the program that are pre-selected prior to tracing.

In implementations, a trace module is disposed in a computing device that records program data according to a first set of criteria and samples a portion of the program data according to a second set of criteria. The trace module in the computing device may also generate a trace file to include the program data recorded according to the first set of criteria and the portion of the program data sampled according to the second set of criteria. In one approach, the trace module may employ random or non-random sampling techniques that generally broaden an area of recording to better 'capture' an indication of events occurring in particular areas of the program data. For instance, sampling techniques can be employed by the trace module when portions of a program are removed from a recorded program.

Using the described modules and techniques, a computing device can perform various recording techniques that produces a trace file. For instance, the recording techniques can be implemented to enable recording of particular portions of a program and/or a machine execution. This is accomplished in part by sampling and/or trimming the program and/or the machine execution. In general, the trace module can be implemented in a computing device to generate a subset of recorded process data for identifying and correcting abnormalities in the process. The trace module can also be implemented to enable recording regardless of events such as kernel calls, external inputs, timed instructions, and so on that are included in the recorded process data. In this way, the trace module can be implemented to record a re-playable version of the program and/or the machine execution despite the re-playable version not including all of the events occurring in the program and/or the machine execution.

Generally, the trace module can generate a trace file that includes a subset of program data to analyze an associated program when the trace file is executed on a computing device. The recording techniques employed by the trace module can include skipping, excluding, and/or limiting an amount of instructions, code, or memory information from a recorded program and/or a machine execution. The recording techniques employed by the trace module can be performed during tracing and/or after the tracing is complete. Accordingly, regardless of whether received data represents a whole or partial program, the trace module can be implemented to record less than the full amount of the received data. In this way, the recording techniques implemented by the trace module can enable less overall use of processing and memory resources in comparison to using conventional recording techniques that typically record all of a program. Further, employing the trace module in a computing device generates a smaller trace file size over conventional trace files that record an entire program. This in turn enables a greater number of trace files to be stored and available for analyzing and investigating at the computing device before a trace limit size is reached. Further, the trace module operates to minimize a size of trace file by recording a subset of data. Thus, trace files generated using the described techniques enable longer recording periods and easier storage, whether stored local to a computing device or remote from the computing device.

Employing the modules and techniques described herein enables recording any unit of code in an executed program. Here, a program can refer to an application or machine code as non-limiting examples. In implementations, the trace module identifies a variety of units in the program (e.g., an instruction, a function, a module, calls made by a particular function, just to name a few) and determines whether to record the identified program unit for inclusion in a trace file. In implementations, the trace module outputs a trace file that represents a subset of the executed program and enables abnormalities in the executed program to be located by analyzing the trace file. By outputting a trace file that represents a subset of the executed program, the trace module enables a computing device to record programs of various sizes that would otherwise not be recordable due to the size of the program and its potential to impact normal operation of the computing device when traced. Techniques for recording programs using the trace module are discussed below.

In the following discussion, an example environment is first described that may employ the techniques described herein. Example illustrations of the techniques and procedures are then described, which may be employed in the example environment as well as in other environments. Accordingly, the example environment is not limited to performing the example techniques and procedures. Likewise, the example techniques and procedures are not limited to implementation in the example environment.

Example Environment

FIG. 1 is an illustration of an environment 100 in an example implementation that is operable to employ techniques described herein. The illustrated environment 100 includes a computing device 102 including a processing system 104 that may include one or more processing devices, one or more computer-readable storage media 106 and a client application module 108 embodied on the computer-readable storage media 106 and operable via the processing system 104 to implement corresponding functionality described herein. In implementations, the client application module 108 may represent a browser of the computing device, or other application, that is operable to access various kinds of local and/or web-based resources (e.g., content and services). The client application module 108 may also represent a client-side component having integrated functionality operable to access local resources, web-based resources (e.g., a network-enabled application), browse the Internet, interact with online providers, and so forth.

The computing device 102 may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 may also relate to software that causes the computing device 102 to perform one or more operations.

The computing device 102 also includes or makes use of a trace module 110 that represents functionality operable to implement techniques for recording processes as described above and below. For instance, the trace module 110 may be operable to receive program data (e.g., previously recorded program data) indicative of an execution of code, record a subset of the program data in accordance with criteria, and reproduce the execution of code responsive to a computing device processing the recorded subset of program data. Additionally or alternatively, the trace module 110 may be operable to trim portions of the execution of code while the tracing is performed, ascertain a portion of recorded instructions for removal, create a trace file with a subset of recorded instructions, and/or perform various trimming and/or sampling techniques to ensure that a subset of data is included in a trace file. Details regarding these and other aspects of recording program data are discussed throughout this document.

The trace module 110 may be implemented as a software module, a hardware device, or using a combination of software, hardware, firmware, fixed logic circuitry, etc. The trace module 110 may be implemented as a standalone component of the computing device 102 as illustrated. In addition or alternatively, the trace module 110 may be configured as a component of the client application module 108, an operating system, or other device application. For example, the trace module 110 may be provided as a plug-in and/or downloadable script for a browser. The trace module 110 may also represent script contained in or otherwise accessible via a webpage, web application, or other resources made available by a service provider, such as the client application module 108.

The environment 100 further depicts one or more service providers 112, configured to communicate with computing device 102 over a network 114, such as the Internet, to provide a "cloud-based" computing environment. Generally, a service provider 112 is configured to make various resources 116 available over the network 114 to clients. The resources 116 can include any suitable combination of services and/or content typically made available over a network by one or more providers. Some examples of services include, but are not limited to, a software editing service, a web development and management service, a collaboration service, a telemetry service, and so forth. Content may include various combinations of text, video, ads, audio, multi-media streams, animations, images, web documents, web pages, applications, device applications, and the like. In one specific scenario, the provider 112 includes a program editing service that provides functionality of the trace module 110 to remote clients that request and/or require recording and tracing functionality provided by the trace module. In another example, the provider 112 provides a telemetry service that includes functionality provided by the trace module 110. In this example, the trace module 110 can be used to remotely gather and/or measure caller-callee graphs, system call usage, code coverage, and so on from any number of end user machines, and can do so independent of a user noticing an interruption at the end user machines.

Web applications 118 represent one particular kind of resource 116 that may be accessible via a service provider 112. As mentioned, web applications 118 may be operated over a network 114 using a browser or other client application module 108 to obtain and run code for the web application. In implementations, the web application 118 may be provided by the browser (or other client application module 108) to support interaction with functionality provided by the trace module 110. For instance, the web application 118 and/or the client application module 108 can facilitate receiving a program for testing, receiving selections of criteria that is usable during recording of a program, outputting a trace file provided by the trace module 110, or a combination thereof.

In FIG. 1, the trace module 110 is also illustrated as including code instrumentation 120 and recording criteria 122 for employing various techniques described herein. The code instrumentation 120 is representative of functionality of the computing device for creating, sampling, generating, skipping, and/or trimming received program data. In implementations, the code instrumentation 120 operates in accordance with the recording criteria 122 to employ recording techniques. For example, the code instrumentation 120 may be configured to perform one or more actions responsive to processing data received from the client application module 108 and/or the web application 118. In implementations, the actions performed by the code instrumentation 120 can include creating a trimmed copy of recorded program data, sampling a portion(s) of program data according to criteria, identifying data for storing in a trace file, and/or generating a discontinuity between an input and output in a program, just to name a few. In implementations, the code instrumentation 120 can identify executed code for removal and/or create new instructions, memory values, and/or code data to represent the executed code identified for removal. Generally, the code instrumentation 120 can represent software, hardware, firmware, or a combination thereof that is configured to enable the recording techniques described herein.

The recording criteria 122 can be implemented by the trace module 110 to cause corresponding portions of the program data to be recorded, removed, sampled, and/or trimmed. Additionally or alternatively, the recording criteria 122 can provide an indication to the trace module 110 to sanitize sensitive information from the program data thereby causing the sensitive information to not record. In implementations, the sensitive information can include authentication information, an Internet Protocol address, or information identifying an author of the code as non-limiting examples. Thus, the criteria can be generally implemented to determine which portions of a program or execution of code to record and/or which portions to not record.

By processing recorded program data, the trace module 110 enables a variety of program units related to a recorded program to be identified, extracted, skipped, removed, and/or processed separately. In this way, the trace module 110 may enable recording program units of the recorded program that are pre-specified by the client application module 108 and/or the web application 118. In implementations, the trace module 110 may extract and/or limit any unit of code in a program responsive to an input received via a user interface associated with an aforementioned application. Here, the user interface can be configured to enable selection of the recording criteria 122. In some instances, messages representing the recording criteria 122 can be presented for selection in the user interface such as "I want to record only code I sign", "I want to record only a function that relates to a particular input" and so on. This can give flexibility to a developer that dynamically directs the tracing to answer specific questions such as "where did the null pointer get loaded from before it was dereferenced to cause a crash," "what were the last few functions calls before the crash," and "what portions of a program include code that I signed?" A variety of other messages for presentation that are related to the recording criteria 122 are contemplated.

The trace module 110 represents functionality that can be employed to selectively generate data from a recorded program and use the generated data to analyze the program, such as to locate particular events in the program and/or correct execution errors in the recorded program at a local or granular level. In this way, the techniques implemented by the trace module 110 can be thought of providing an incremental or carved out 'view' of the recorded program. Overall, using the described techniques reduces memory and processing overhead and/or generates less trace file data for storage (typically a half bit per instruction) compared to conventional techniques that record an entire program and typically storing a bit per instruction. Further, abnormalities in an executed program can be found more quickly compared to conventional debugging techniques because the trace module generates less data to represent the program from which to locate an error.

Conventional recording techniques can require storing a snapshot of an entire process to memory and then recording a trace file from the stored process. Thus, conventional recording techniques typically require memory to store the entire process before recording takes place. Accordingly, memory requirements are utilized regardless of what is recorded which can result in a negative impact on a device and/or a user. In contrast, the recording techniques described herein can, for instance, be implemented to record portions of a program without committing the skipped, sampled, trimmed, or removed portions to memory which can free up memory and/or processing resources for other tasks.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., a central processing unit(s)). The program code can be stored in one or more computer readable memory devices. The features of the recording techniques described below are platform-independent, meaning that the techniques may be implemented on a variety of commercial computing platforms having a variety of processors.

Having considered an example environment, consider now a discussion of some example details of techniques for recording process data in accordance with one or more implementations.

Figure 2:
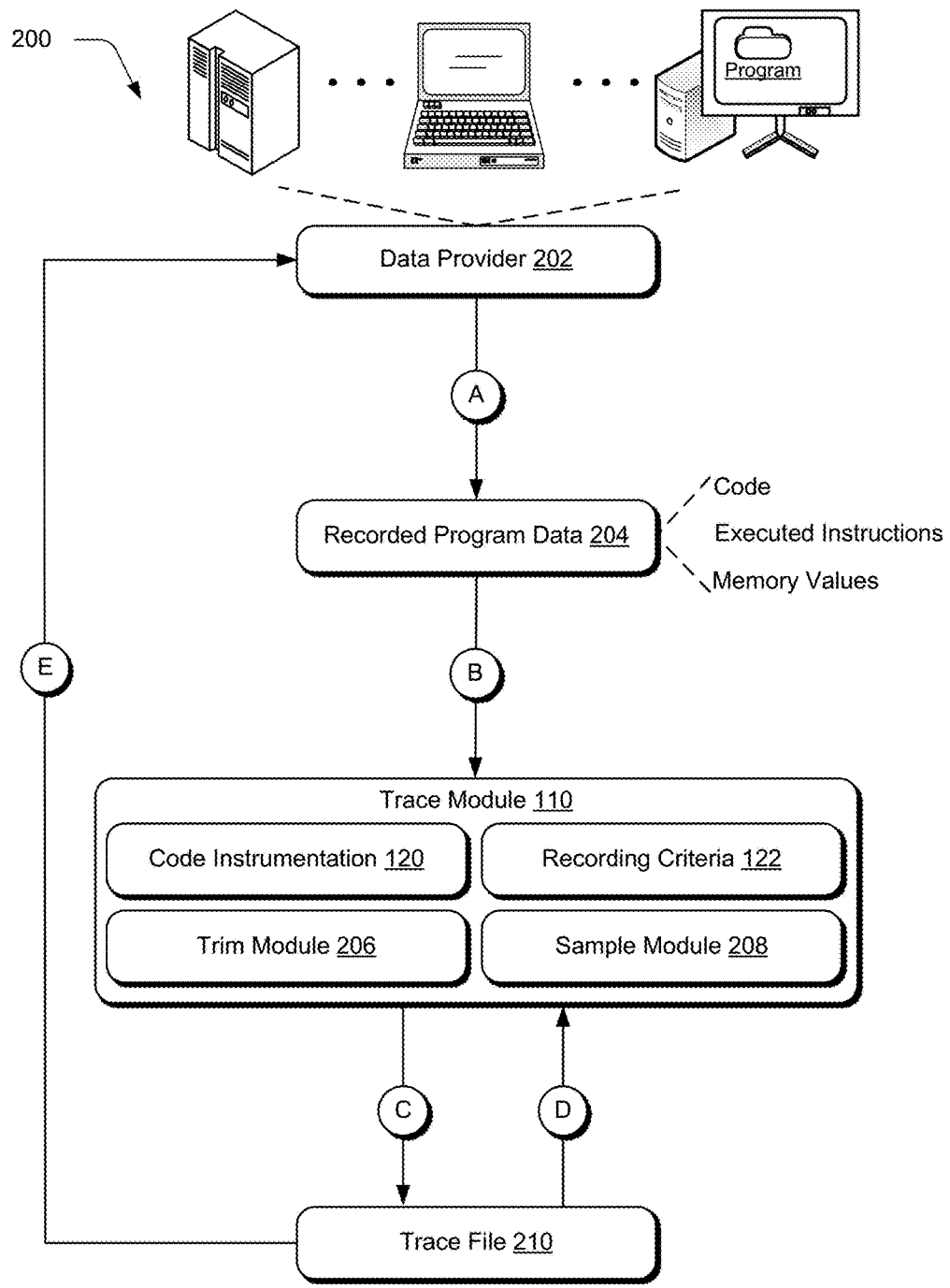
FIG. 2 is a diagram representing example scenarios for recording executed program code in accordance with one or more implementations.

FIG. 2 is a diagram representing an example scenario 200 for recording executed program code in accordance with one or more implementations. In the example 200, a data provider 202 is illustrated as generating recorded program data 204 (see 'A') and providing this data to the trace module 110 (see 'B') which includes a trim module 206 and a sample module 208. As shown in FIG. 2, the trace module 110 can output trace file 210 (see 'C') which is generally representative of data and/or a file for performing various testing and/or optimization techniques on the recorded program data.

In the scenario 200 of FIG. 2, the data provider 202 can be implemented to send full or partial recorded program data (code, executed instructions, and/or memory values) related to an application or program to the trace module 110 for processing. In some instances, the data provider 202 represents a service, an individual computing device, and/or a group of devices. In one specific example, the data provider 202 can be representative of the computing device 102.

In the example 200, the trace module 110 receives the recorded program data 204 from the data provider 202 and employs the code instrumentation 120, the recording criteria 122, the trim module 206, and/or the sample module 208 to output the trace file 210, which is generally representative of data generated by the trace module 110.

The recording criteria 122 can include one or more of: a particular module, a particular data type, a particular thread, a particular function, a function and related function calls, a function execution conditioned to an input parameter value, a particular amount of recorded program data, a percentage of the executed code, code in a particular module, code not in a particular module, code signed by a particular entity, all code in the executed code except a particular function or part of a particular function, or a particular amount of time. The recording criteria 122 can represent a single criteria or a set of multiple criteria and can be made available to the trace module 110 in a variety of ways. For instance, different sets of criteria can be assigned to different modules of the trace module, such as the trim module 206 and the sample module 208.

The trim module 206 is generally representative of functionality to skip, filter, and/or extract program data and can be implemented in various ways. For instance, the trim module 206 can be employed to filter an amount of recorded program data, exclude and/or include a program unit based on the recording criteria, skip a portion of a program dependent upon the criteria, replay a trace file, generate a new trace file in accordance with the criteria, or a combination thereof. The trim module 206 can be implemented while recording a trace file from receives program data. In one specific example, the trim module 206 receives an entire machine execution of a process, trims the execution of the process according to a selected process (or subset of that process), and outputs a trace file indicative of the trimmed execution.

In addition or alternatively, the trim module 206 can be implemented to account for an effect of removing a particular program unit. In an example when function A calls function B, and function A is trimmed, parameters that function B gets from function A can be made explicit in the trace file by the trim module 206. For instance, including function B in the trace file can include storing certain parameters of function A to enable function B to be replayable as part of the trace file. In this way, the trim module 206 can be implemented to capture information that enables function B to execute with parameters of function A despite not saving function A to memory. Further discussion of the trim module 206 can be found in relation to FIGS. 3-8.

The sample module 208 is generally representative of functionality to capture a subset of process data and can be implemented in various ways. In implementations, the sample module 208 determines an amount and/or portions of process data to record using the recording criteria 122. The sample module 208 can also or instead be implemented to record received process data for a pre-determined amount of time. Thus, the sample module can be implemented to perform various sampling techniques based on a particular amount of time, an amount of process data, and/or a portion of process data. In specific examples, the sample module 208 can record 10 milliseconds (ms) after an identified kernel, 1 ms after an exception, and/or record 10 percent of an amount of time that code is in a selected module, just to name a few. In implementations, sampling can be performed according a first set of criteria while recording is generally performed according to a second set of criteria.

As discussed further below, operations performed by the sample module 208 can be performed in conjunction with operations performed by the trim module 206. In examples, data generated by the trim module can be reduced by randomly sampling a particular amount of the generated data. For instance, the sample module 208 can randomly capture 10 percent of the trimmed data before the trace module outputs the trimmed and sampled data as the trace file 210.

The trace file 210 represents less of an amount of overall data than the recorded program data 204. Depending on the recording criteria 122, the trace file 210 can include particular portions of the recorded program data 204. In implementations, the trace file can be processed after being 'trimmed' such that additional trimming can occur under different and/or similar criteria, which is generally shown in FIG. 2 at 'C' and 'D'. The trace file 210 can also be provided by the trace module 110 to the data provider 202 as shown at 'E'. Here, the trace file 210 may be communicated as a trace file. In addition or alternatively, the trace file 210 provided to the data provider 202 may include data that includes an error or fault in the recorded program data 204.

Consider an example implementation in which the data provider 202 represents a corporation running an application on multiple devices, and the application executes recorded program data that causes an error. In this example, the data provider 202 sends the recorded program data 204 to the trace module 110 acting as a program optimization and debug service over a network, such as the network 114 of FIG. 1. In some instances, the data provider 202 can access functionality performed by the trace module 110 to process the recorded program data 204 prior to sending. In this way, the recorded program data 204 sent by the data provider can represent a full process or program (e.g., all inputs, outputs, and calls, are recorded) or a partial or 'trimmed' copy of the program data. This enables the data provider to perform recording techniques enabled by the trace module 110 to send a subset of data that is usable for further processing by the trace module.

The trace module 110 in FIG. 2 can also be implemented to perform recording techniques for a remote device independent of the remote device detecting operations performed by trace module 110. For instance, multiple computing devices associated with the data provider 202 may be running an application that crashes on only a small percentage of the multiple computing devices. To locate the cause of the crash, conventional techniques typically record millions of instructions in a ring buffer. However, the ring buffer can stop working as a result of the crash and/or the recorded instructions can be replaced with new instructions as the ring buffer becomes full thereby causing an increase in a perceivable impact in program behavior and/or performance. By implementing the trace module, less time is spent recording data over conventional techniques which results in a user of one of the multiple computing devices not being able to ascertain a perceivable impact in program behavior and/or performance while the tracing is being performed. Generally, the trace module can be implemented to perform the recording techniques while using fewer memory and/or processing resources during recording versus conventional techniques.

Further, recording data from the multiple computing devices is 'targeted' or 'filtered' according to the recording criteria 122 resulting is less overall time being spent to locate an error versus using conventional recording techniques. This can be achieved in part by implementing functionality performed by the trim module 206 and/or the sample module 208 of the trace module 110. In one specific implementation, the sample module can sample a portion of the available program data executed on the multiple computing devices of the data provider and use the sample portion to include in a trace file. Here, sampling can include recording program data in accordance with the recording criteria 122 over a percentage of the multiple computing devices.

Figure 3:
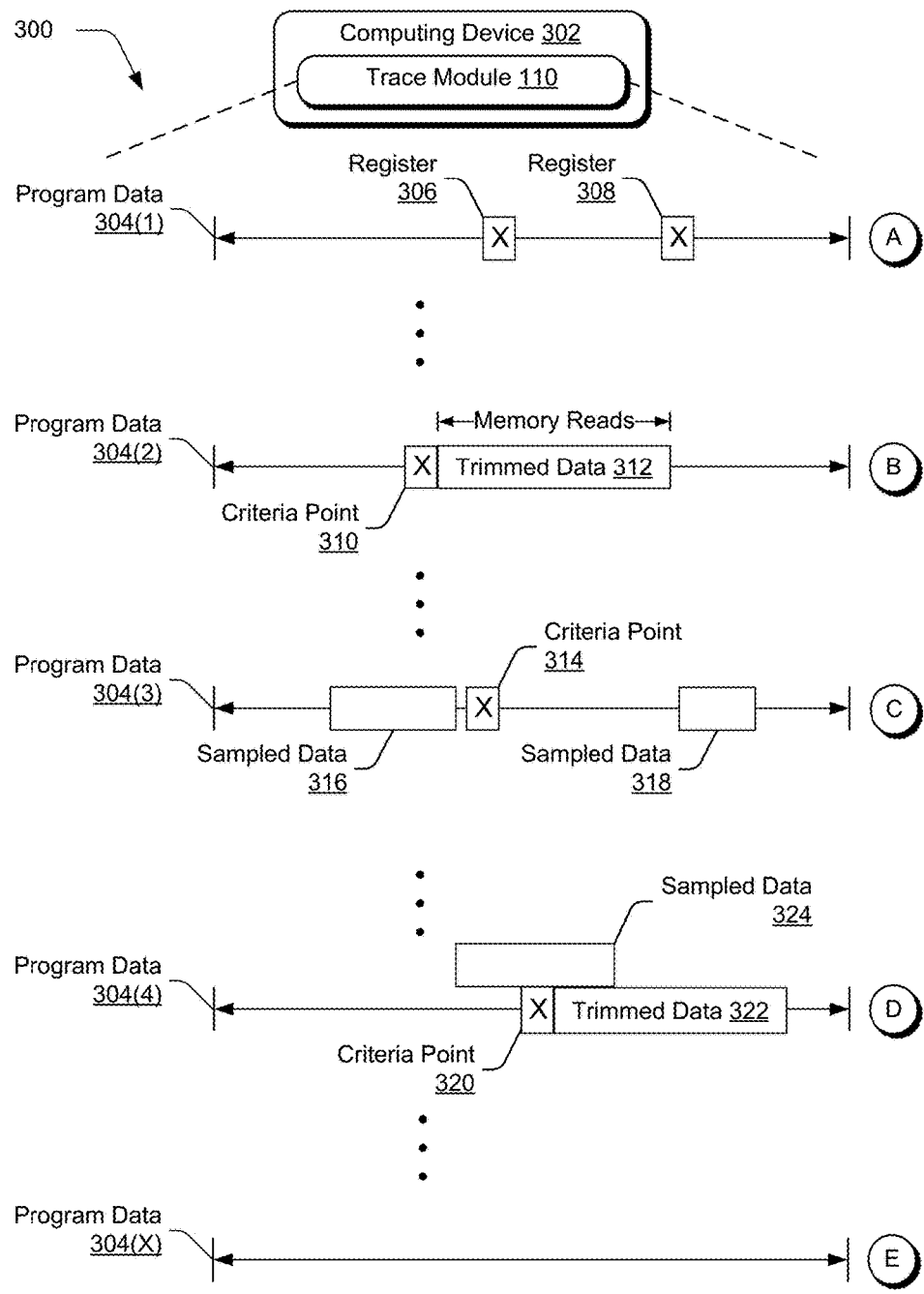
FIG. 3 depicts a computing device in an example implementation to perform recording techniques as described herein.

FIG. 3 depicts generally at 300 a computing device 302 in an example implementation to perform recording techniques as described herein. The computing device 302, for example, represents an instance of the computing device 102. Generally, the computing device 302 includes the trace module 110 of FIG. 1 to employ any of the techniques described herein. As shown in FIG. 3, the trace module 110 processes different instances of program data 304(X) which represents a recorded program that is executable to perform a particular task. Accordingly, the program data 304 can include code, memory reads, register values, and other data that collectively represents a functional program. The trace module 110 can optionally create a trace file from the processed program data.

FIG. 3 shows registers 306 and 308 as part of the program data 304 which generally keeps track of memory reads (see 'A'). In the example implementation of FIG. 3, the computing device 302 can identify registers 306 and 308 according to the recording criteria 122. For instance, the program data 304 can be analyzed by the trace module 110 to determine points in the program data that correspond to the recording criteria 122. In one specific implementation, the computing device 302 operates to record a subset of the program data 304 by recording the register 306 and the register 308 according to same and/or different recording criteria included in the recording criteria 122.

Start and stop points for recording can be identified by the trace module 110 whether implementing sampling and/or trimming techniques, and can generally correspond to the register 306 and 308, for instance. At the start point of a recorded portion (i.e., segment), the trim module 110 can store metadata to indicate if sampling and/or trimming is performed. At the stop point, the trim module can store an indication of a length of time that represents the recorded portion. Additional segments can be recorded having corresponding start and stop points. In some examples, the trim module can record only information of the additional segments that includes data different from the first segment by enabling the second segment to leverage the metadata stored in relation to the first segment. Accordingly, 'gaps' in a recoded program or execution of code can be accounted for even when an external entity modified a program state e.g., tracing user mode code, a kernel call, and the like.

At 'B' in FIG. 3, a pre-specified criteria point 310 is identified by the trace module 110. In one specific implementation, the trace module 110 can identify the criteria point 310 in the program data 304 that corresponds to at least some of the recording criteria 122 and record trimmed data 312. Here, the trimmed data 312 includes memory reads and can be extracted for inclusion in a trace file. Program data can be trimmed before, at, and/or after the criteria point 310 in the program data 304 to capture a 'side effect' of an event (an action, a task, etc.) occurring at the criteria point 310. Of course, the trimmed data 312 may also or instead include additional data other than memory reads such as instructions, register values, etc., further discussion of which can be found elsewhere herein.

FIG. 3 depicts at 'C' an example in which program data is sampled according to a criteria point 314. For instance, responsive to receiving selection of some recording criteria 122, data associated with the criteria point 314 is determined. Here, sampled data 316 and 318 represent areas of the program data 304 that are likely to include an execution error. To determine how a program arrived at a 'crashed' state, the sampled data 316 and 318 can include a number of instructions adjacent to the criteria point 314. In one specific implementation, a specific number of instructions can be recorded to produce the sampled data 316 and/or the sampled data 318. Thus, a developer can target a specific number of instructions around a particular event in the program data 304 to ensure that the execution error is caught in a generated trace file output by the trace module 110. Further, in the above example in which the data provider 204 represents the corporation running the application on multiple devices, the trace module 110 can be implemented to determine a cause of a crash or error in any one of the multiple devices and initiate correction of the crash or the error to improve overall performance of the multiple devices.

FIG. 3 further depicts at 'D' an example in which program data is sampled and trimmed according to a criteria point 320. For instance, trimmed data 322 and sampled data 324 can be created by the trace module 110 to compress the program data. Of course, entire portions of the program data can be omitted from being recorded. Consequently, the program data at 'E' in FIG. 3 generally represents received program data that is processed by the trace module 110 but not recorded. A trace file can be output by the trace module 110 that includes some or all of the recorded portions described in 'A'-'D' above. Further, the sampled data 316, 318, and/or 324 can also or instead be recorded randomly such that the sampled data does not depend on the recording criteria 122 or a related criteria point.

Although only single criteria points are shown at 'B', 'C', and 'D' in FIG. 3, the example implementations can include multiple criteria points to 'focus' recording to specific portions of the program. Moreover, the trace module can perform the recording techniques described herein including enabling partial recording of a recorded program independent of kernel calls, external inputs, timed instructions, and the like, included in the program data 304.

Various actions such as receiving, generating, skipping, identifying, locating, sampling, and so forth performed by various modules are discussed herein. It should be appreciated that the various modules may be configured in various combinations with functionality to cause these and other actions to be performed. Functionality associated with a particular module may be further divided among different modules and/or the functionality represented by multiple modules may be combined together into a single logical module. For instance, the trim module 206 and the sample module 208 can be included in the code instrumentation 120. Moreover, a particular module may be configured to cause performance of action directly by the particular module. In addition, or alternatively, the particular module may cause particular actions by invoking or otherwise accessing other components or modules to perform the particular actions (or perform the actions in conjunction with that particular module).

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

In portions of the following discussion, reference may be made to the examples of FIGS. 1-3. In at least some implementations, procedures 400, 500, 600, 700, and/or 800 may be performed by a suitably configured computing device such as computing device 102 of FIG. 1, computing device 302 of FIG. 3, or as described in relation to FIG. 9.

Figure 4:
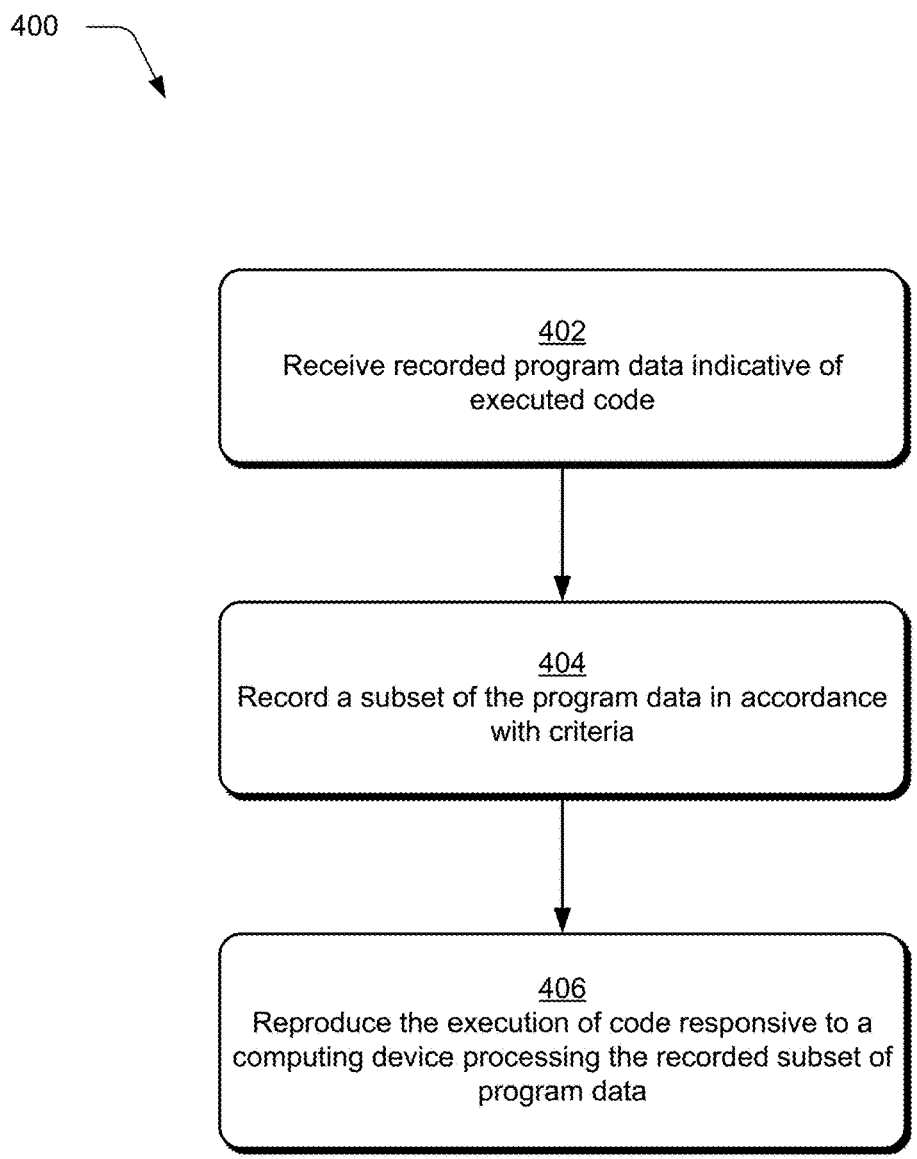
FIG. 4 is a flow diagram depicting a procedure in an example implementation in which a subset of a program is recorded in accordance with one or more implementations.

FIG. 4 is a flow diagram depicting a procedure in an example implementation in which a subset of a program is recorded in accordance with one or more implementations. Program data indicative of an execution of code is received (block 402). For example, the trace module 110 may receive the recorded program data 204 from the data provider 202 responsive to initiation by the data provider 202. In other examples, the trace module 110 can initiate receiving the program data by automatically notifying the data provider (with or without the data provider 202 being aware of a request for the recorded program data by the trace module 110).

A subset of the program data is recorded in accordance with criteria (block 404). For instance, in one or more implementations, the trace module 110 processes the recorded program data 204 using any of the techniques described herein. In one approach, the trace module 110 extracts a portion of the recorded program data using the criteria 122 and samples a same or different portion of the recorded program data using the sample module 208.

The execution of the code is reproduced responsive to a computing device processing the recorded subset of program data (block 406). In one specific implementation, the trace module 110 generates new program data that generally represents less of an amount of data as compared to the program data. By including the trace module 110 in a computing device and using the recorded criteria 122, the trace module 110 can be implemented to enable recording any unit of code in an executed program. In at least some implementations, one or more of the trace files can be communicated over a computer network to the data provider 202 which can cause an application and/or other process to be repaired to prevent a corresponding error from occurring during execution of the application/process.

Figure 5:
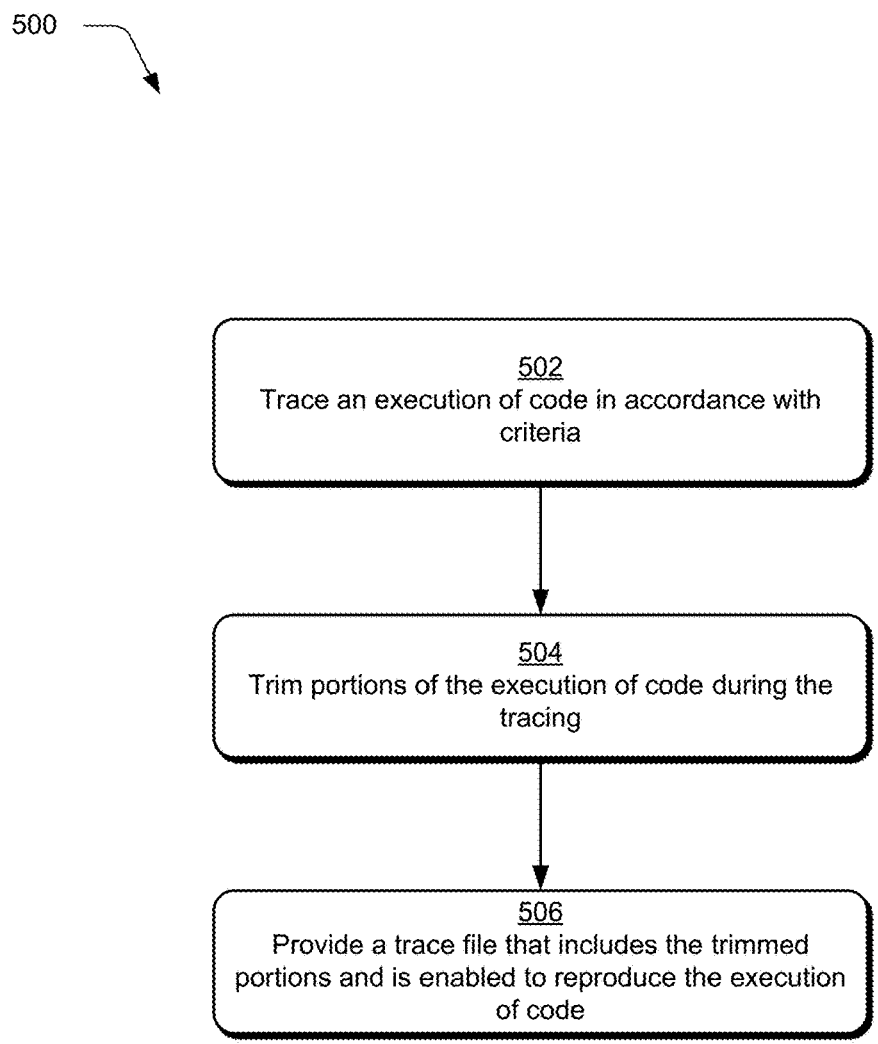
FIG. 5 is a flow diagram depicting a procedure in an example implementation in which a trace file is enabled to reproduce an execution of code in accordance with one or more implementations.

FIG. 5 is a flow diagram depicting a procedure in an example implementation in which a trace file is enabled to reproduce an execution of code in accordance with one or more implementations. An execution of code is traced in accordance with criteria (block 502). For example, the trace module 110 may trace the executed code in accordance with the recording criteria 122.

Portions of the execution of code are trimmed during the tracing (block 504). For instance, the trace module 110 creates, filters, and/or trims the executed code being traced. In an example, the trace module 110 operates in accordance with the recording criteria 122 to target areas of interest in the executed code and record the areas of interest.

A trace file is provided that includes the trimmed portions and is enabled to reproduce the execution of code (block 506). For instance, a trace file generated by the trace module 110 can be executed to produce executions of code that are similar to the received execution of code from which the trace file is generated. In one approach, an application can employ typical debug techniques by processing and/or accessing the trace file. In one specific example, the trace file executes on a computing device to reproduce particular events in the executed code regardless of the areas that are removed from the executed code.

Figure 6:
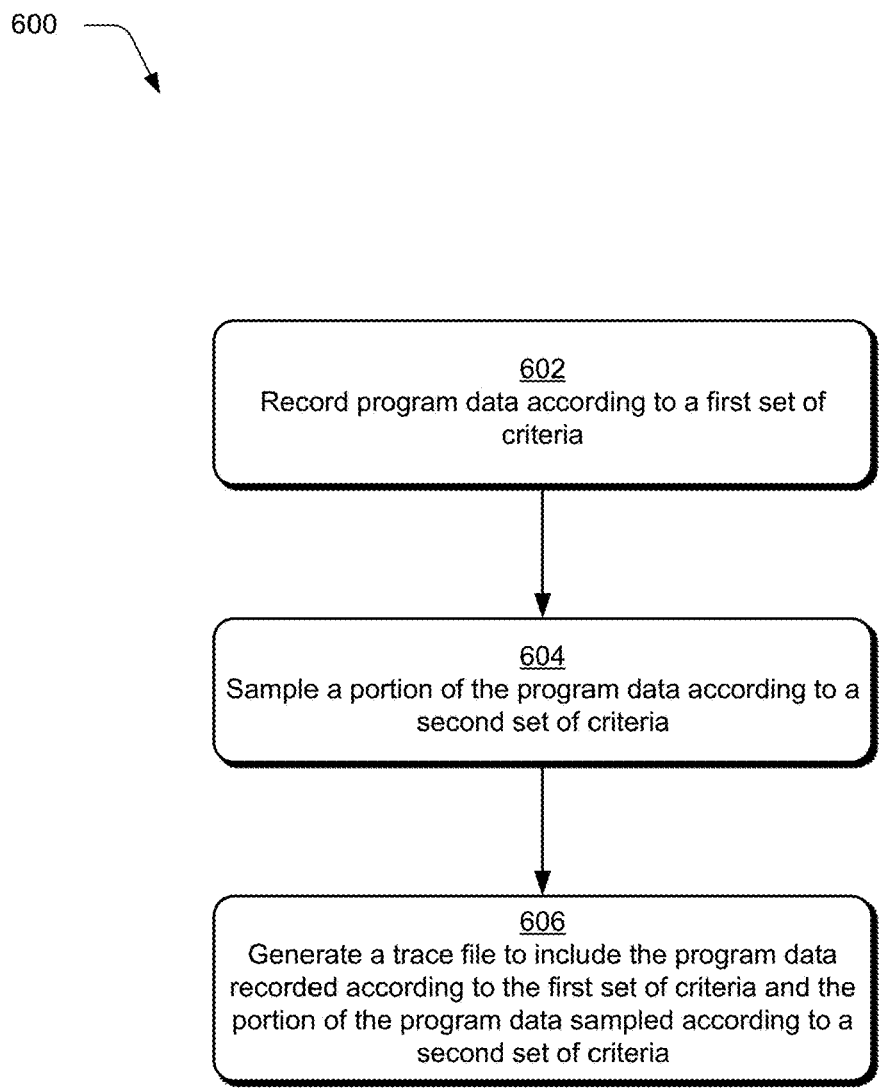
FIG. 6 is a flow diagram depicting a procedure in an example implementation in which a trace file is generated to include sampled data in accordance with one or more implementations.

FIG. 6 is a flow diagram depicting a procedure in an example implementation in which a trace file is generated to include sampled data in accordance with one or more implementations. Program data is recorded according to a first set of criteria (block 602). For example, the trace module 110 may utilize the code instrumentation 120, the trim module 206, and/or the sample module 208 to process the program data in accordance with the recording criteria 122.

A portion of the program data is sampled according to a second set of criteria (block 604). For instance, the trace module 110 performs any of the various sampling techniques using the sample module 208. In an example, the sample module 208 captures random portions of the received program data. In this way, the sampled portions can combine with the program data recorded according to the first set of criteria. Therefore, in this example, the trace module 110 can record data according to one set of criteria and supplement the recorded data with program data that is sampled according to another set of criteria.

A trace file is generated to include the program data recorded according to the first set of criteria and the portion of the program data sampled according to a second set of criteria (block 606). For instance, the trace file is generated by the trace module 110 to include the recorded and sampled portions of the program data. In one approach, the trace file can replicate the program, including replicating an execution error in the received program data despite the trace file not including each of the program units included in the received program data. In at least some implementations, the trace file can be generated to cause a reduction in memory and/or processor utilization at a computing device while recording as compared to employing conventional techniques. In implementations, employing the trace module 110 can cause a subset of the program data to be included in the trace file.

Figure 7:
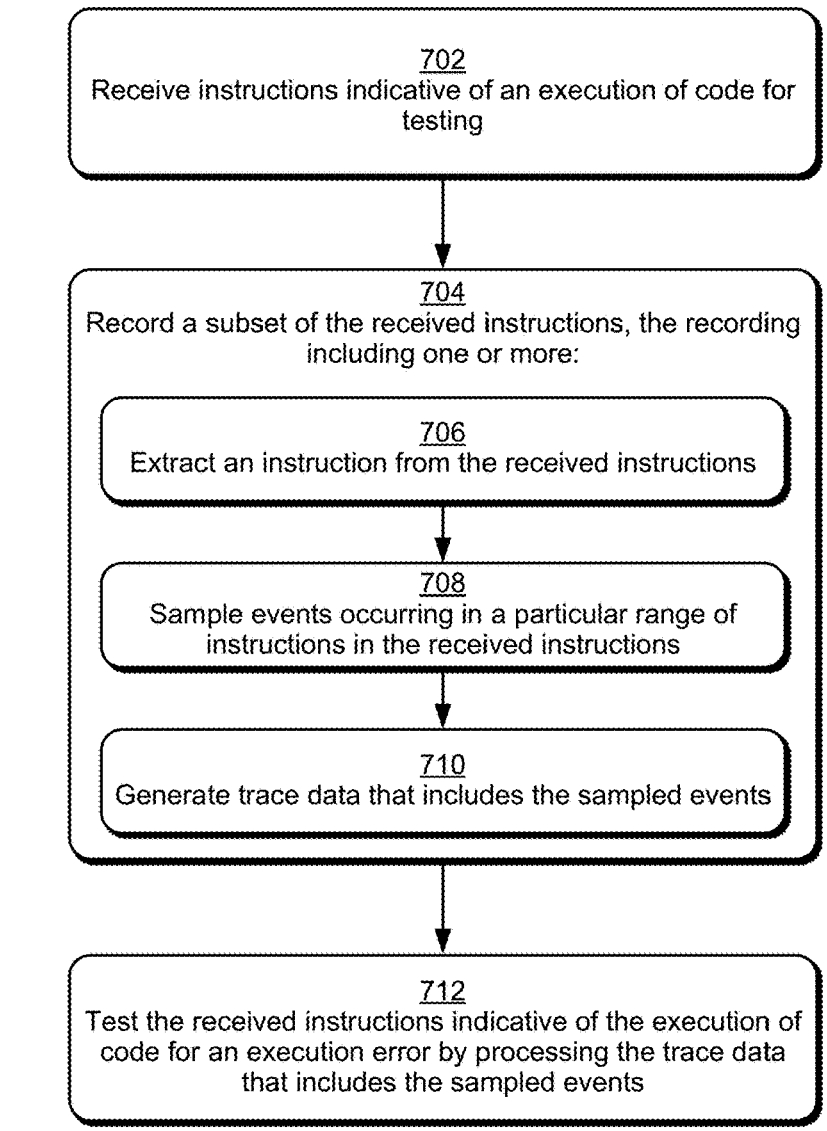
FIG. 7 is a flow diagram depicting a procedure in an example implementation in which a subset of recorded instructions are recorded and used to test for execution errors in accordance with one or more implementations.

FIG. 7 is a flow diagram depicting a procedure in an example implementation in which a subset of recorded instructions are recorded and used to test for execution errors in accordance with one or more implementations. Instructions indicative of an execution of code are received for testing (block 702). For example, the trace module 110 may receive a full or partial set of program instructions to test for run errors.

A subset of the received instructions is recorded (block 704). For instance, the trace module 110 performs any of the various trimming and/or sampling techniques employed by the trim module 206 and/or the sample module 208. Recording the subset of the received instructions can include one or more of extracting an instruction from the received instructions (706), sampling events occurring in a particular range of instructions in the received instructions (708), and generating trace data that includes the sampled events (710). In an example, the sample module 208 randomly selects a particular range of instructions in the received instructions to record.

The received instructions indicative of the execution of code are tested for an execution error by processing the trace data that includes the sampled events (block 712). For instance, a trace file is generated by the trace module 110 that includes the sampled events in the form of the trace data. In one specific example, the trace file can be shared with conventional debug tools to enable these tools to execute the trace data in the trace file and locate a possible error in the received instructions. In one specific instance, an execution error can be identified by comparing an execution result from running the received instructions indicative of the execution of code with an execution result from running the trace file.

Figure 8:
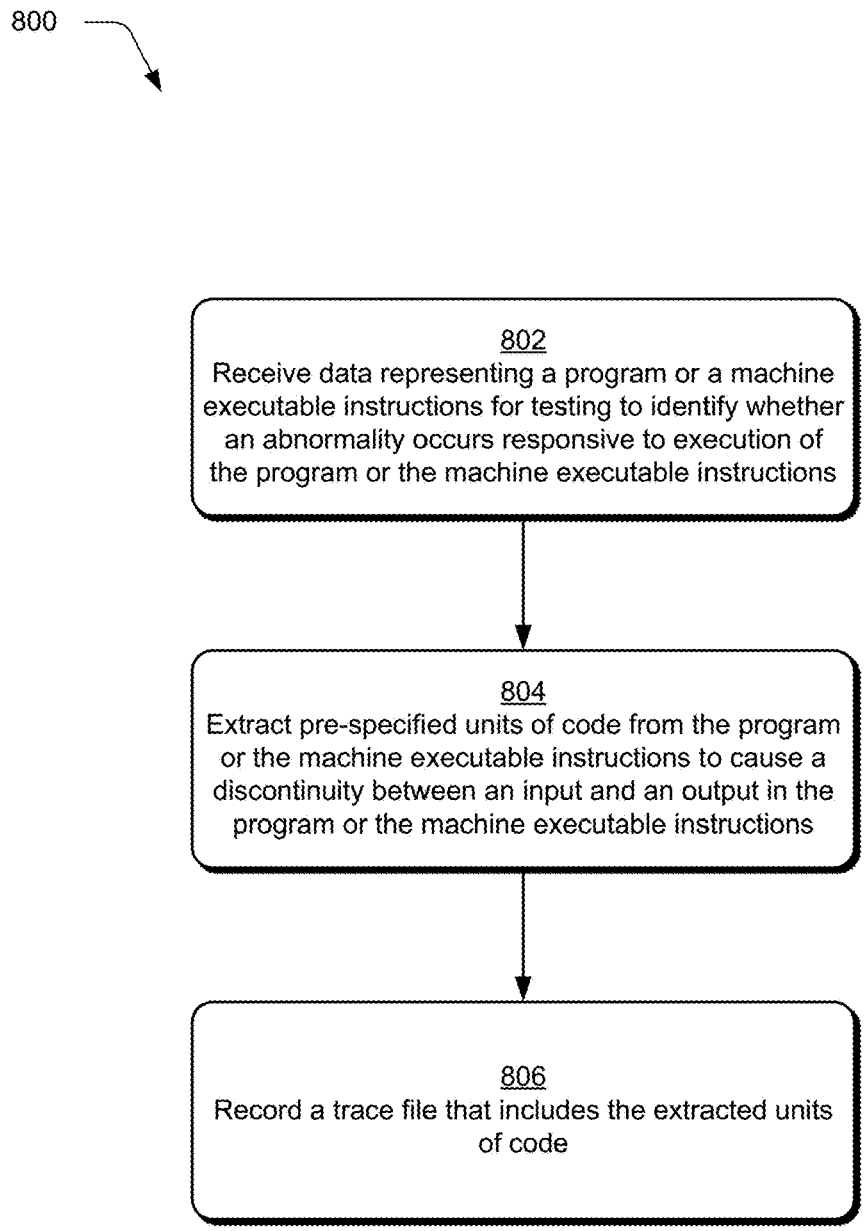
FIG. 8 is a flow diagram depicting a procedure in an example implementation in which a discontinuity is generated in a program or machine executable instructions in accordance with one or more implementations.

FIG. 8 is a flow diagram depicting a procedure in an example implementation in which a discontinuity is generated in a program or machine executable instructions in accordance with one or more implementations. Data representing a program or machine executable instructions is received for testing to identify whether an abnormality occurs responsive to execution of the program or the machine executable instructions (block 802). For example, the trace module 110 may receive a selection(s) of different recording criteria 122 for use with processing the received data. In one example, data may be received as part of a 'crash dump' by the data provider 204. In some instances, the trace module 110 can collect the data from the data provider 204 independent of a request by the data provider 204.

Pre-specified units of code are extracted from the program or the machine executable instructions to cause a discontinuity between an input and an output in the program or the machine executable instructions (block 804). For instance, the trace module 110 performs any of the various trimming and/or sampling techniques employed by the trim module 206 and/or the sample module 208 to extract and represent units of code in accordance with selected recording criteria 122. In implementations, the trace module 110 selectively removes portions of the program or the machine executable instructions which causes the inputs and outputs to no longer be linear, or follow from one another. Nonetheless, the trace module 110 is able to replicate the received program or machine executable instructions.

A trace file is recorded that executes with the generated discontinuity (806). For instance, the trace module 110 creates the trace file without the pre-specified units of code and enables the trace file for execution at the computing device 102 and/or enables execution of the trace file at the data provider 204 responsive to the trace module 110 communicating the trace file to the data provider 204.

In one specific example, a computing device can receive and process the trace file for errors using traditional techniques even when the trace module 110 is not included in the computing device. Thus, a trace file with a discontinuity can be used by a computing device after the trace file is generated without requiring the trace module 110 to execute or understand the data included in the trace file.

Accordingly, techniques described herein enable a computing device to record subsets of machine code for analysis. For instance, recording techniques can be implemented to enable remote and/or local program monitoring and optimization. Further, the recording techniques can be implemented by the described modules to enable errors in program data to be more quickly identified and corrected over conventional recording techniques.

Example System and Device

Figure 9:
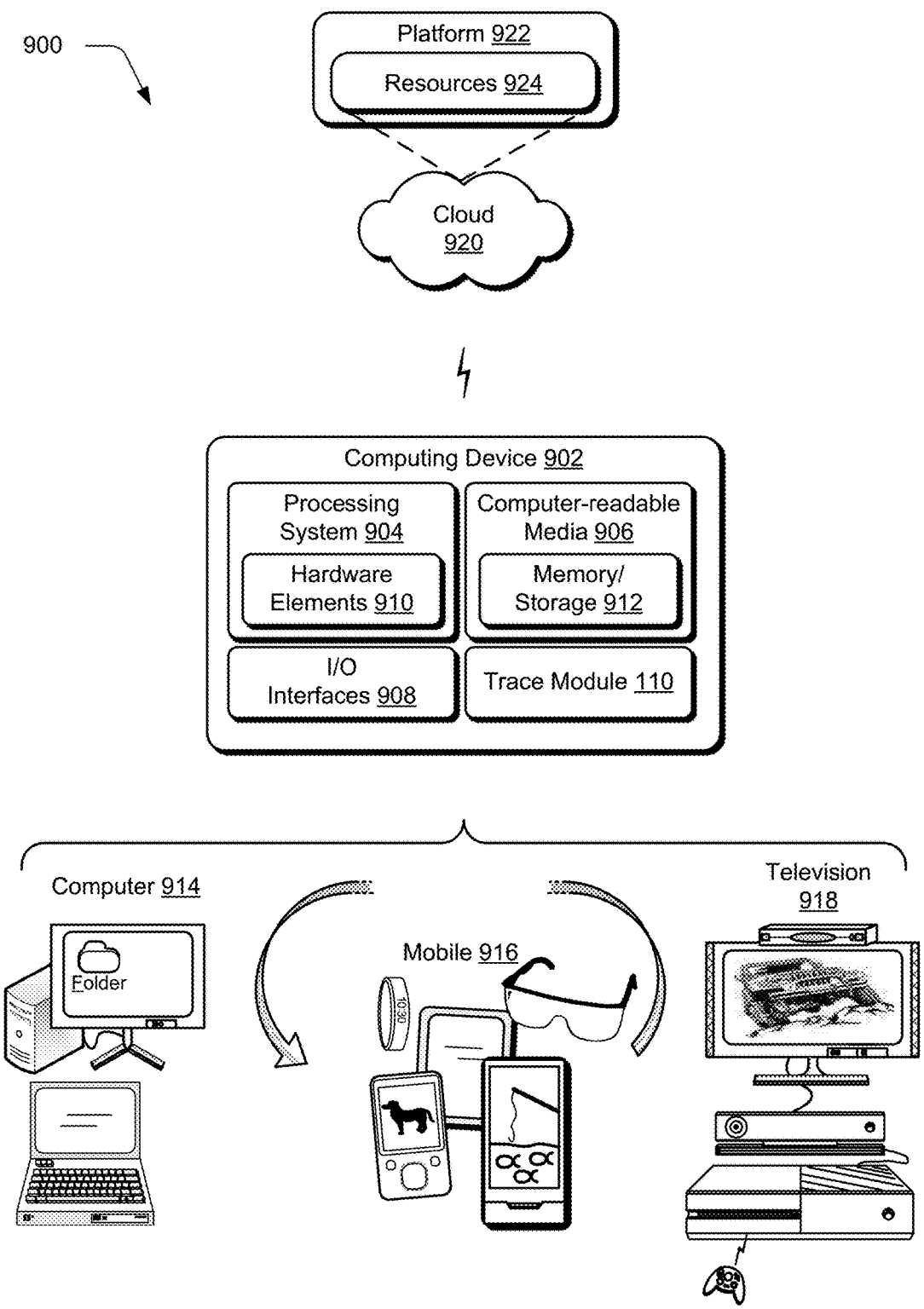
FIG. 9 illustrates various components of an example system that can implement aspects of the recording techniques described herein in accordance with one or more implementations.

FIG. 9 illustrates an example system 900 that includes an example computing device 902 that is representative of one or more computing systems and/or devices that may implement the various techniques described herein. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 906 is illustrated as including memory/storage 912. The memory/storage 912 represents memory/storage capacity associated with one or more computer-readable media. The memory/storage 912 may include volatile media (such as random access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a stylus, a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Computer-readable storage media does not include signal bearing media, transitory signals, or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to signal-bearing media that is configured to transmit instructions to the hardware of the computing device 902, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including the trace module 110 and other program modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of modules as a module that is executable by the computing device 902 as software may be achieved at least partially in hardware, e.g., through use of computer-readable storage media and/or hardware elements 910 of the processing system. The instructions and/or functions may be executable/operable by one or more articles of manufacture (for example, one or more computing devices 902 and/or processing systems 904) to implement techniques, modules, and examples described herein.

As further illustrated in FIG. 9, the example system 900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 900, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 902 may assume a variety of different configurations, such as for computer 914, mobile 916, and television 918 uses. Each of these configurations includes devices that may have generally different constructs and capabilities, and thus the computing device 902 may be configured according to one or more of the different device classes. For instance, the computing device 902 may be implemented as the computer 914 class of a device that includes a personal computer, desktop computer, a multi-screen computer, laptop computer, netbook, and so on.

The computing device 902 may also be implemented as the mobile 916 class of device that includes mobile devices, such as a mobile phone, portable music player, portable gaming device, a tablet computer, a multi-screen computer, and so on. The computing device 902 may also be implemented as the television 918 class of device that includes devices having or connected to generally larger screens in casual viewing environments. These devices include televisions, set-top boxes, gaming consoles, and so on.

The techniques described herein may be supported by these various configurations of the computing device 902 and are not limited to the specific examples of the techniques described herein. This is illustrated through inclusion of the trace module 110 the computing device 902. The functionality represented by the trace module 110 and other modules/applications may also be implemented all or in part through use of a distributed system, such as over a "cloud" 920 via a platform 922 as described below.

The cloud 920 includes and/or is representative of a platform 922 for resources 924. The platform 922 abstracts underlying functionality of hardware (e.g., servers) and software resources of the cloud 920. The resources 924 may include applications and/or data that can be utilized while computer processing is executed on servers that are remote from the computing device 902. Resources 924 can also include services provided over the Internet and/or through a subscriber network, such as a cellular or Wi-Fi network.

The platform 922 may abstract resources and functions to connect the computing device 902 with other computing devices. The platform 922 may also serve to abstract scaling of resources to provide a corresponding level of scale to encountered demand for the resources 924 that are implemented via the platform 922. Accordingly, in an interconnected device embodiment, implementation of functionality described herein may be distributed throughout the system 900. For example, the functionality may be implemented in part on the computing device 902 as well as via the platform 922 that abstracts the functionality of the cloud 920.

Implementations discussed herein include:

Example 1

A system for trimming portions of a program during tracing of the program, the system comprising: a processor; and computer-readable storage media including instructions stored thereon that, responsive to execution by the processor, cause the system to perform operations comprising: tracing an execution of code in accordance with criteria; during the tracing, trimming portions of the execution of code; and providing a trace file that includes the trimmed portions and is enabled to reproduce the execution of code.

Example 2

The system as described in example 1, the operations further comprising sanitizing the code to remove sensitive information during the tracing.

Example 3

The system as described in one or more of examples 1 or 2, wherein the trimming includes identifying at least some of the code being executed for removal and representing the code identified for removal with instructions, memory values, or code data to capture an effect of the code being executed for removal.

Example 4

The system as described in one or more of examples 1-3, the operations further comprising detecting, for each concurrent thread of execution, a change in memory contents that occurred from outside the recording, including memory modifications effected by a hardware component, a kernel, another thread, or another process.

Example 5

The system as described in one or more of examples 1-4, wherein the criteria is automatically determined independent of user input.

Example 6

The system as described in one or more of examples 1-5, wherein the trace file includes less data than an amount of data available to trace.

Example 7

A method implemented by a computing device to record a subset of program data, the method comprising: receiving program data indicative of an execution of code; recording the subset of the program data in accordance with criteria; and reproducing the execution of code responsive to the computing device processing the recorded subset of program data.

Example 8

The method as described in example 7, further comprising enabling the recorded subset of program data to replicate an error in the execution of code.

Example 9

The method as described in one or more of examples 7 or 8, further comprising enabling analysis of the recorded subset of program data to identify data in the execution of code.

Example 10

The method as described in one or more of examples 7-9, wherein the recording includes identifying, in accordance with the criteria, a point in the execution of code at which to remove a portion of the received program data.

Example 11

The method as described in one or more of examples 7-10, wherein the criteria includes one or more of: a particular module, a particular data type, a particular thread, a particular function, a function and related function calls, a function execution condition to an input parameter value, a particular amount of program data, a percentage of the execution of code, code in a particular module, code not in a particular module, code signed by a particular entity, all code in the execution of code except a particular function or part of a particular function, or a particular amount of time.

Example 12

The method as described in one or more of examples 7-11, wherein the program data includes execution data, memory data, or code data.

Example 13

The method as described in one or more of examples 7-12, further comprising trimming the recorded subset of program data in accordance with a different criteria than the criteria used to perform the recording of the subset of program data.

Example 14

A method implemented by a computing device for generating a trace file to include sampled data, the method comprising: recording program data according to a first set of criteria; sampling a portion of the program data according to a second set of criteria; and generating a trace file to include the program data recorded according to the first set of criteria and the portion of the program data sampled according to the second set of criteria.

Example 15

The method as described in example 14, wherein the program data includes memory data, executed instructions, or code data.

Example 16

The method as described in example 14 or 15, further comprising trimming the program data according to the first set of criteria.

Example 17

The method as described in one or more of examples 14-16, further comprising outputting the trace file for presentation in a user interface or receiving an input indicative of a selection of the first set of criteria by a user.

Example 18

The method as described in one or more of examples 14-17, wherein the first set of criteria includes an indication to record or not record a particular event in the program data, a predefined number of executed instructions, a particular data type, a particular function, or code signed by a particular entity and the second set of criteria includes at least one criteria that is different from the criteria included in the first set of criteria.

Example 19

The method as described in one or more of examples 14-18, further comprising providing the trace file to identify an abnormality in the program data.

Example 20

The method as described in one or more of examples 14-19, further comprising executing the trace file to reproduce events occurring during execution of the program data.

Conclusion

Although the techniques have been described in language specific to structural features and/or methodological acts, it is to be understood that the subject matter defined in the appended claims is not necessarily limited to the specific features or acts described. Rather, the specific features and acts are disclosed as example forms of implementing the claimed subject matter, and other equivalent features and methods are intended to be within the scope of the appended claims. Further, various different embodiments are described and it is to be appreciated that each described embodiment can be implemented independently or in connection with one or more other described embodiments.

What is claimed is:

1. A system for trimming portions of a program during tracing of the program, the system comprising:
   one or more processors;
   a memory; and
   computer-readable storage media including instructions stored thereon that, responsive to execution by the one or more processors, cause the system to perform operations comprising:
      executing code of a program at the one or more processors, including executing a plurality of program units in the code of the program;
      while executing the code of the program at the one or more processors, identifying replay-able trace data that represents the execution of the code of the program at the one or more processors, the replay-able trace data comprising a plurality of portions of trace data that record the execution of a plurality of program units of the code of the program;
      identifying a subset of the plurality of portions of trace data that record execution of a pre-specified subset of the plurality of program units that is less than all of the plurality of program units, the subset of the plurality of portions of trace data being less than all of the plurality of portions of trace data; and
      based on the subset of the plurality of portions of trace data recording execution of the pre-specified subset of the plurality of program units, committing the subset of the plurality of portions of trace data to a replay-able trace that is stored in the memory, such that the replay-able trace enables replay of a subset of the prior execution of the code of the program that corresponds to execution of the pre-specified subset of the plurality of program units.

2. The system of claim 1, the operations further comprising sanitizing the replay-able trace to remove sensitive information during the tracing of the program.

3. The system of claim 1, wherein the operations further comprising representing one or more program units in the replay-able trace with one or more of: instructions, memory values, or code data that capture an effect of the one or more program units.

4. The system of claim 1, the operations further comprising detecting, during execution of the code of the program at the one or more processors, a change in memory contents that occurred from outside the code of the program, including memory modifications effected by one or more of: a hardware component, a kernel, another thread, or another process.

5. The system of claim 1, wherein the pre-specified subset of the plurality of program units are automatically determined independent of user input.

6. The system of claim 1, wherein the replay-able trace includes one or more of: memory data, executed instructions, or code data.

7. The system of claim 1, the operations further comprising outputting the replay-able trace for presentation in a user interface.

8. The system of claim 1, the operations further comprising providing the replay-able trace to identify an abnormality in the execution of the code of the program at the one or more processors.

9. The system of claim 1, the operations further comprising replaying the replay-able trace to reproduce events occurring during the execution of the code of the program at the one or more processors.

10. The system of claim 1, wherein the subset of the plurality of portions of trace data is identified based on one or more of an input parameter value, a particular amount of trace data, a percentage of recorded execution of code, code not in a particular module, or code signed by a particular entity.

11. A method, implemented at a computer system that includes one or more processors, for trimming portions of a program during tracing of the program, the method comprising:
   executing code of a program at the one or more processors, including executing a plurality of program units in the code of the program;
   while executing the code of the program at the one or more processors, identifying replay-able trace data that represents the execution of the code of the program at the one or more processors, the replay-able trace data comprising a plurality of portions of trace data that record the execution of a plurality of program units of the code of the program;
   identifying a subset of the plurality of portions of trace data that record execution of a pre-specified subset of the plurality of program units that is less than all of the plurality of program units, the subset of the plurality of portions of trace data being less than all of the plurality of portions of trace data; and
   based on the subset of the plurality of portions of trace data recording execution of the pre-specified subset of the plurality of program units, committing the subset of the plurality of portions of trace data to a replay-able trace that is stored in a memory, such that the replay-able trace enables replay of a subset of the prior execution of the code of the program that corresponds to execution of the pre-specified subset of the plurality of program units.

12. The method of claim 11, further comprising sanitizing the replay-able trace to remove sensitive information during the tracing of the program.

13. The method of claim 11, further comprising representing one or more program units in the replay-able trace with one or more of: instructions, memory values, or code data that capture an effect of the one or more program units.

14. The method of claim 11, further comprising detecting, during execution of the code of the program at the one or more processors, a change in memory contents that occurred from outside the code of the program, including memory modifications effected by one or more of: a hardware component, a kernel, another thread, or another process.

15. The method of claim 11, wherein the pre-specified subset of the plurality of program units are automatically determined independent of user input.

23

16. The method of claim 11, wherein the replay-able trace includes one or more of: memory data, executed instructions, or code data.

17. The method of claim 11, further comprising providing the replay-able trace to identify an abnormality in the execution of the code of the program at the one or more processors.

18. The method of claim 11, further comprising replaying the replay-able trace to reproduce events occurring during the execution of the code of the program at the one or more processors.

19. The method of claim 11, wherein the subset of the plurality of portions of trace data is identified based on one or more of an input parameter value, a particular amount of trace data, a percentage of recorded execution of code, code not in a particular module, or code signed by a particular entity.

20. A computer program product comprising one or more hardware storage devices having stored thereon computer-executable instructions that are executable by one or more processors of a computer system to cause the computer system to perform at least the following:

execute code of a program at the one or more processors, including executing a plurality of program units in the code of the program;

24 while executing the code of the program at the one or more processors, identify replay-able trace data that represents the execution of the code of the program at the one or more processors, the replay-able trace data comprising a plurality of portions of trace data that record the execution of a plurality of program units of the code of the program;

identify a subset of the plurality of portions of trace data that record execution of a pre-specified subset of the plurality of program units that is less than all of the plurality of program units, the subset of the plurality of portions of trace data being less than all of the plurality of portions of trace data; and based on the subset of the plurality of portions of trace data recording execution of the pre-specified subset of the plurality of program units, commit the subset of the plurality of portions of trace data to a replay-able trace that is stored in a memory, such that the replay-able trace enables replay of a subset of the prior execution of the code of the program that corresponds to execution of the pre-specified subset of the plurality of program units.

* * * * *